(12) United States Patent
Wu et al.

(10) Patent No.: US 8,780,802 B2
(45) Date of Patent: Jul. 15, 2014

(54) COMMUNICATION SIGNAL MULTIPLEXING METHOD, RADIO COMMUNICATION SYSTEM, AND RADIO EQUIPMENT CONTROLLER

(75) Inventors: Xingguo Wu, Kista (SE); Jun Zhou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 161 days.

(21) Appl. No.: 13/161,848

(22) Filed: Jun. 16, 2011

(65) Prior Publication Data

US 2011/0243071 A1   Oct. 6, 2011

Related U.S. Application Data

(63) Continuation of application No. PCT/CN2009/075584, filed on Dec. 15, 2009.

(30) Foreign Application Priority Data

Dec. 17, 2008   (CN) .......................... 2008 1 0241623

(51) Int. Cl.
*H04W 4/00* (2009.01)
(52) U.S. Cl.
USPC ........... 370/328; 370/350; 370/392; 370/318; 370/466; 370/442; 370/471; 370/335; 370/342
(58) Field of Classification Search
None
See application file for complete search history.

(56) References Cited

U.S. PATENT DOCUMENTS

| | | | |
|---|---|---|---|
| 2003/0137981 A1* | 7/2003 | Tsai et al. | 370/392 |
| 2005/0105534 A1 | 5/2005 | Osterling | |
| 2006/0217157 A1 | 9/2006 | Yagawa | |
| 2007/0091896 A1 | 4/2007 | Liu | |
| 2007/0116046 A1 | 5/2007 | Liu et al. | |
| 2008/0219262 A1* | 9/2008 | Roay | 370/392 |
| 2008/0225816 A1 | 9/2008 | Osterling et al. | |
| 2009/0245228 A1* | 10/2009 | Osterling | 370/350 |
| 2011/0135013 A1* | 6/2011 | Wegener | 375/241 |

FOREIGN PATENT DOCUMENTS

CN   1842183 A   10/2006
(Continued)

OTHER PUBLICATIONS

"Gateway control protocol: Version 3; H.248.1 (Sep. 2005)—series H; Audiovisual and multimedia systems—Infrastructure of audiovisual services—Communication procedures"; ITU-T Standard in Force (I), International Telecommunication Union, Geneva, CH, Sep. 13, 2005, 205 pages, including pp. i-u and 1-195.
"Gateway control protocol: Package for removal of digits and tones; H.248.68 (Mar. 2009)", ITU-T Standard, International Telecommunication Union, Geneva, CH, Mar. 16, 2009, 12 pages.

(Continued)

*Primary Examiner* — Ian N Moore
*Assistant Examiner* — Eric H Wang
(74) *Attorney, Agent, or Firm* — Staas & Halsey LLP (57) ABSTRACT

The present invention discloses a communication signal multiplexing method, a radio communication system, and a radio equipment controller (REC). Taking the common public radio interface (CPRI) standard as an example, by carrying multiple CPRI links on limited physical links (CPRI-MUX), generally one high-speed physical link, physical bandwidth is used more efficiently and the number of interconnected interfaces and the system cost are reduced without compromising with the CPRI standard is maintained. When the bandwidth provided by the high-speed physical link is insufficient, more physical links can be adopted.

11 Claims, 7 Drawing Sheets

(56) References Cited

FOREIGN PATENT DOCUMENTS

| | | | |
|---|---|---|---|
| CN | 1860811 | A | 11/2006 |
| CN | 1956564 | A | 5/2007 |
| CN | 1960231 | A | 5/2007 |
| CN | 101018392 | A | 8/2007 |
| CN | 101188818 | A | 5/2008 |
| CN | 101489156 | A | 7/2009 |
| CN | 101489156 | B | 11/2011 |
| EP | 1304845 | | 4/2003 |
| EP | 1708520 | | 10/2006 |
| EP | 1713290 | | 10/2006 |
| WO | 2006/040653 | | 4/2006 |
| WO | WO 2008058471 | A1 | 5/2008 |
| WO | 2008/114351 | A1 | 9/2008 |

OTHER PUBLICATIONS

European Search Report issued Jul. 19, 2011 in corresponding European Patent Application No. 09726510.2-2413.
Chinese Office Action issued Mar. 9, 2011 in corresponding Chinese Patent Application 200810241623.2.
Written Opinion of the International Searching Authority mailed Mar. 25, 2010 in corresponding International Patent Application PCT/CN2009/075584.
International Search Report, mailed Mar. 25, 2010, in corresponding International Application No. PCT/CN2009/075584 (4 pp.).
Chinese Office Action mailed Jul. 2, 2013 in corresponding Chinese Patent Application No. 201110331089.6 (3 pages) (2 pages English Translation).
Chinese Office Action dated Mar. 25, 2014 in corresponding Chinese Patent Application No. 201110331089.6 (4 pages).

\* cited by examiner

COMMUNICATION SIGNAL MULTIPLEXING METHOD, RADIO COMMUNICATION SYSTEM, AND RADIO EQUIPMENT CONTROLLER

CROSS-REFERENCE TO RELATED APPLICATIONS

This application is a continuation of International Application No. PCT/CN2009/075584, filed on Dec. 15, 2009, which claims priority to Chinese Patent Application No. 200810241623.2, filed on Dec. 17, 2008, both of which are hereby incorporated by reference in their entireties.

FIELD OF THE INVENTION

The present invention relates to the field of communications, and in particular, to a communication signal multiplexing method, a radio communication system, and a radio equipment controller.

BACKGROUND OF THE INVENTION

A radio base station system includes a radio equipment controller (REC) and a radio equipment (RE). The interface connecting the REC and the RE can be described as an REC-RE interface.

The common public radio interface (CPRI) standard is an interface standard defined by communication equipment vendors. According to the standard, the REC-RE interface connecting the REC and RE is a CPRI interface.

The open base station architecture initiative (OBSAI) standard is another interface standard defined by communication equipment vendors. According to the standard, the REC-RE interface connecting the REC and RE is an OBSAI interface.

With the rapid development of radio network technologies, to protect investments of operators and reduce the risk caused by market changes, the industry proposes the concept of multi-mode base station. One description of the concept of multi-mode base station is: a base station which can support the application of two or more communication modes in one cabinet.

The benefits of multi-mode base stations include:

(1) The base station equipment including its hardware platform and software architecture can be reused.

(2) Repeated equipment installation is spared and the space of sites is reduced.

For example, the concept of global system for mobile communications/universal mobile telecommunications system (GSM/UMTS) dual-mode base station emerged at the end of the 1990s with the gradual maturity of the international mobile telecommunication-2000 (IMT-2000) technology. However, because the lifecycle of GSM is far longer than expected and the software defined radio (SDR) technology makes slow progress, SDR-based multi-mode base stations cannot satisfy the needs of operators.

Multi-mode base station solutions are still urgently required in the market.

SUMMARY OF THE INVENTION

Embodiments of the present invention provide a communication signal multiplexing method, a radio communication system, and an REC.

An embodiment of the present invention provides a communication signal multiplexing method applicable to a radio communication system which includes at least two interconnected RECs, a first REC and a second REC, where the second REC is connected to at least a first multi-mode RE and a second multi-mode RE. The communication signal multiplexing method includes:

receiving first data sent by the first REC to the first multi-mode RE and the second multi-mode RE;

demultiplexing the first data to obtain data sent by the first REC to the first multi-mode RE and data sent by the first REC to the second multi-mode RE;

multiplexing the data sent by the first REC to the first multi-mode RE and data sent by the second REC to the first multi-mode RE to obtain second data;

multiplexing the data sent by the first REC to the second multi-mode RE and data sent by the second REC to the second multi-mode RE to obtain third data;

sending the second data to the first multi-mode RE; and sending the third data to the second multi-mode RE, where:

the first data is obtained by multiplexing the data sent by the first REC to the first multi-mode RE and the data sent by the first REC to the second multi-mode RE on at least one physical link, and the second REC receives the first data through the at least one physical link.

An embodiment of the invention provides an radio communication system which comprises a REC, and the REC is connected to at least a first multi-mode RE and a second multi-mode RE and includes a multiplexing/demultiplexing module configured to:

receive first data sent by another REC to the first multi-mode RE and the second multi-mode RE;

demultiplex the first data to obtain data sent by the another REC to the first multi-mode RE and data sent by the another REC to the second multi-mode RE;

multiplex the data sent by the another REC to the first multi-mode RE and data sent by the REC to the first multi-mode RE to obtain second data; and multiplex the data sent by the another REC to the second multi-mode RE and data sent by the REC to the second multi-mode RE to obtain third data, where:

the first data is obtained by multiplexing the data sent by the another REC to the first multi-mode RE and the data sent by the another REC to the second multi-mode RE on at least one physical link, and the multiplexing/demultiplexing module receives the first data through the at least one physical link.

Another embodiment of the invention provides an radio communication system, which comprises a REC, and the REC communicates with at least a first multi-mode RE and a second multi-mode RE and includes a multiplexing/demultiplexing module configured to:

multiplex data sent to the first multi-mode RE and the second multi-mode RE on at least one physical link and send the multiplexed data to another REC; and demultiplex data received from the first multi-mode RE and the second multi-mode RE through the at least one physical link.

A radio communication system comprising a first radio equipment controller (REC) and a second REC, wherein the second REC is connected to at least a first multi-mode RE and a second multi-mode RE.

Taking CPRI as an example, in the embodiments of the invention, by carrying multiple CPRI links on limited physical links (CPRI-MUX), usually one high-speed physical link, physical bandwidth is used more efficiently and the number of interconnected interfaces and the system cost are reduced without compromising with the CPRI standard. When the bandwidth provided by the high-speed physical link is insufficient, more physical links can be adopted.

DETAILED DESCRIPTION OF THE EMBODIMENTS

For purposes of description rather than limitation, details of specific structures, interfaces, and techniques are provided for understanding the present invention. Those skilled in the art are clear that the present invention can be implemented in other embodiments departing from these details. In other circumstances, detailed descriptions of commonly known apparatuses, circuits, and methods are not described, so that the description of the present invention is not hindered by unnecessary details. In addition, blocks of functions are provided in some accompanying drawings. Those skilled in the art know that these functions can be implemented by independent hardware circuits, properly programmed digital microprocessors or universal computer software, application specific integrated circuits (ASICs), and/or one or more digital signal processors (DSPs).

The embodiments of the present invention are described by taking the WCDMA/GSM dual-mode as an example. The dual modes or multiple modes combinations can be derived by analogy. These combinations may include any two or more of the following modes: GSM, Code Division Multiple Access (CDMA), Wideband Code Division Multiple Access (WCDMA), Time Division Synchronous Code Division Multiple Access (TD-SCDMA), Long Term Evolution (LTE), Worldwide Interoperability for Microwave Access (WiMAX), Ultra Mobile Broadband (UMB), Personal Handy-phone System (PHS), Air Interface Evolution (AIE), and new radio communication modes occurring in the future, such as WCDMA/CDMA dual-mode, WCDMA/WiMAX dual-mode, and WCDMA/GAM/CDMA multimode. The embodiments of the invention are described based on the CPRI interface, and other type of REC-RE interfaces, such as the OBSAI interface, Ir interface involved in TD-SCDMA, and private REC-RE interfaces defined by equipment vendors can be obtained by analogy. The embodiments of the invention are described based on a CPRI basic frame, and similar frames related to other REC-RE interfaces can be derived by analogy. The embodiments of the invention are described based on control word in a CPRI basic frame, and similar control information carried in frames related to other REC-RE interfaces can be derived by analogy. Likewise, the entities, devices, apparatuses, and units with specific names related in the embodiments of the invention can be replaced with other entities, devices, apparatuses, and units of the same or similar functions.

Figure 1:
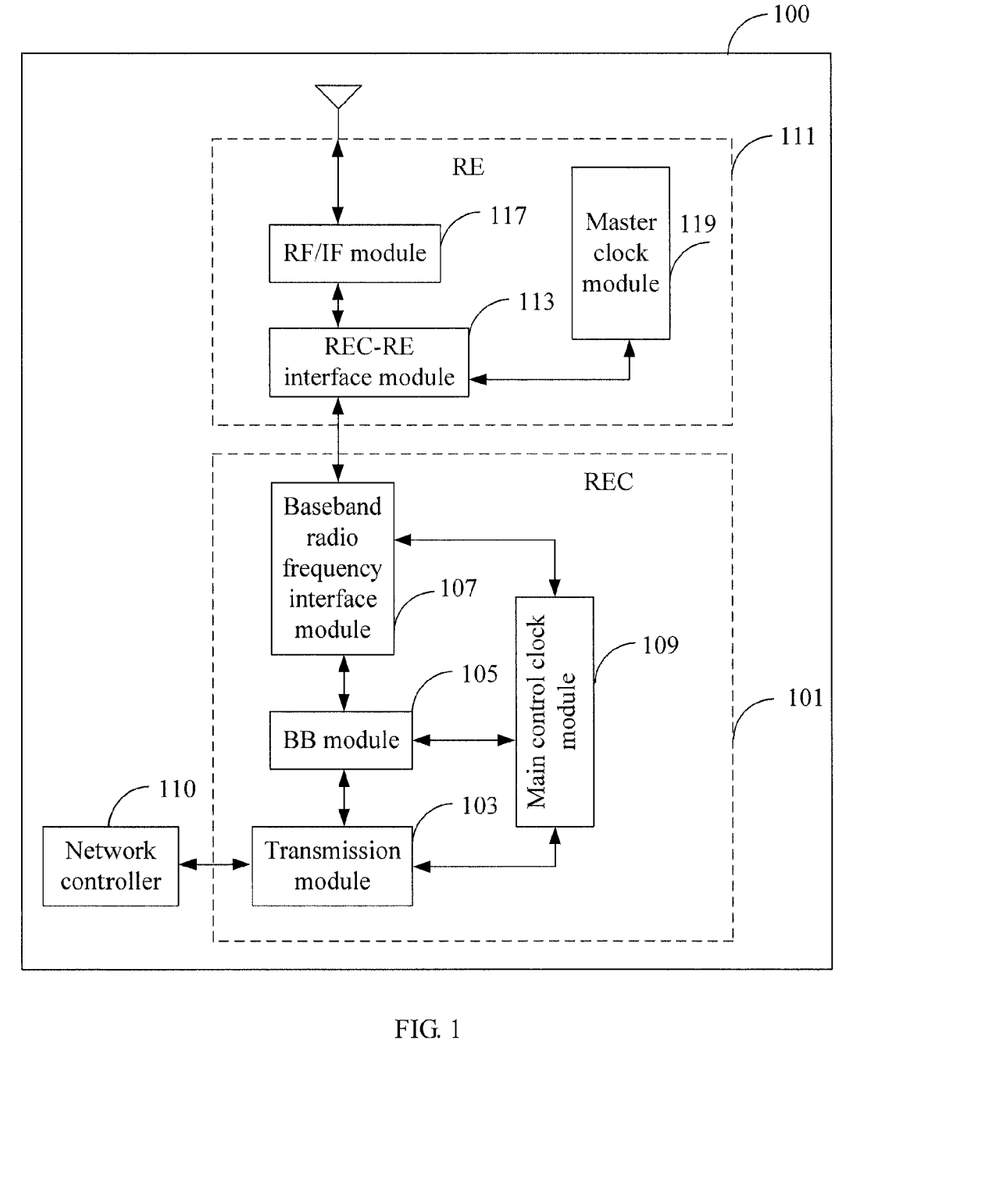
FIG. 1 is a schematic structural diagram of a radio base station system 100 that includes an REC and an RE according to each embodiment of the invention.

FIG. 1 is a schematic structural diagram of a radio base station system 100 that includes an REC and an RE according to an embodiment of the invention.

The REC 101 generally includes a transmission module 103 connected to a network controller 110, a baseband (BB) module 105 connected to the transmission module 103, a baseband radio frequency interface module 107 connected to the BB module 105, and a main control clock module 109 connected to the transmission module 103, the BB module 105, and the baseband radio frequency interface module 107. In practice, these function modules can be highly integrated, for example, integrated into one or more boards, and disposed on a small-sized baseband Unit (BBU) to form a field replaceable unit (FRU).

In an uplink, under the control of the main control clock module, a signal from an RE 111 is transmitted through the baseband radio frequency interface module 107, to the BB module 105 for processing, such as demodulation and decoding, and finally, the signal is transmitted to the network controller 110 through the transmission module 103.

In a downlink, under the control of the main control clock module, a signal from the network controller 110 is transmitted through the transmission module 103, to the BB module 105 for processing such as encoding and modulation and the processed signal is transmitted to the RE 111 through the BB-RF interface module 107.

The RE 111 generally includes: an REC-RE interface module 113 connected to the REC 101, a main control clock module 119 connected to the REC-RE interface module 113, and a radio frequency/intermediate frequency (RF/IF) module 117. In the RF/IF module 117, the IF module is optional. This means that the RF/IF module 117 may include only an RF module.

In the uplink, a signal from the air interface is processed by the RF/IF module 117, such as RF filtering and amplification, frequency down-conversion, analog-to-digital conversion, and digital filtering, and then the processed signal is transmitted to the REC 101 through the REC-RE interface module 113.

In the downlink, a signal from the REC 101 is transmitted through the REC-RE interface module 113 to the RF/IF module 117 for processing, such as digital-to-analog conversion, frequency up-conversion and filtering and amplification, and finally transmitted through an antenna.

Forms of the RE may include: radio remote unit (RRU), radio and filter unit (RFU), and multi-mode RF unit supporting multiple modes.

An embodiment of the present invention provides a communication signal multiplexing method. The method is applicable to a radio communication system which includes at least two interconnected RECs: a first REC and a second REC, where the second REC is connected to at least a first multi-mode RE and a second multi-mode RE. The method includes:

receiving first data sent by the first REC to the first multi-mode RE and the second multi-mode RE;

demultiplexing the first data to obtain data sent by the first REC to the first multi-mode RE and data sent by the first REC to the second multi-mode RE;

multiplexing the data sent by the first REC to the first multi-mode RE and data sent by the second REC to the first multi-mode RE to obtain second data;

multiplexing the data sent by the first REC to the second multi-mode RE and data sent by the second REC to the second multi-mode RE to obtain third data;

sending the second data to the first multi-mode RE; and sending the third data to the second multi-mode RE.

The first data is obtained by multiplexing the data sent by the first REC to the first multi-mode RE and the data sent by the first REC to the second multi-mode RE on one physical link, and the second REC receives the first data through the physical link.

Another embodiment of the invention provides an REC which is connected to at least a first multi-mode RE and a second multi-mode RE, and the REC includes a multiplexing/demultiplexing module which is configured to:

receive first data sent by another REC to the first multi-mode RE and the second multi-mode RE;

demultiplex the first data to obtain the data sent by the another REC to the first multi-mode RE and the data sent by the another REC to the second multi-mode RE;

multiplex the data sent by the another REC to the first multi-mode RE and data sent by the REC to the first multi-mode RE to obtain second data; and multiplex the data sent by the another REC to the second multi-mode RE and data sent by the REC to the second multi-mode RE to obtain third data.

The first data is obtained by multiplexing the data sent by the another REC to the first multi-mode RE and the data sent by the another REC to the second multi-mode RE on one physical link, and the multiplexing/demultiplexing module receives the first data through the physical link.

Another embodiment of the invention provides an REC which communicates with at least a first multi-mode RE and a second multi-mode RE, and the REC includes a multiplexing/demultiplexing module which is configured to:

multiplex data sent to the first multi-mode RE and the second multi-mode RE on one physical link and send the multiplexed data to another REC; and demultiplex the data received from the first multi-mode RE and the second multi-mode RE through the physical link.

Another embodiment of the invention provides a radio communication system which includes any one of the above RECs that communicates with at least two multi-mode REs.

Figure 2:
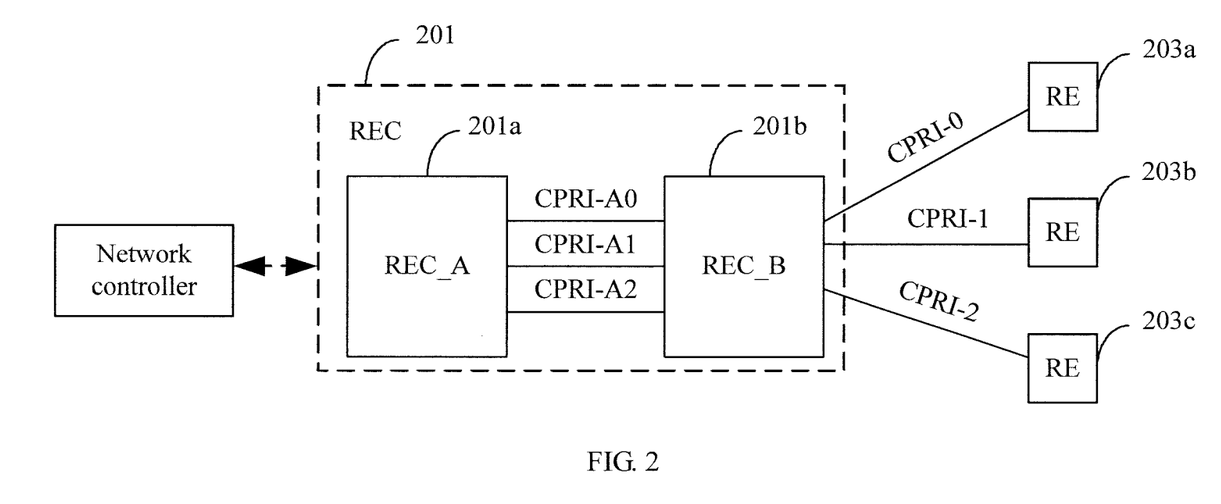
FIG. 2 is a schematic diagram of a multi-mode base station solution according to an embodiment of the invention.

FIG. 2 is a schematic diagram of a multi-mode base station solution according to an embodiment of the invention.

An REC 201 is connected to three dual-mode REs and connected to a network controller. The REC 201 may be connected to the network controller in the following way: through REC_A 201a; or through REC_B 201b, or connected to two network controllers of different communication modes respectively through REC_A 201a and REC_B 201b. Between REC_B 201b and each dual-mode RE, there is a separate CPRI physical link: the physical link between REC_B 201b and RE 203a is CPRI-0; the physical link between REC_B 201b and RE 203b is CPRI-1; and the physical link between REC_B 201b and RE 203c is CPRI-2.

There are multiple CPRI physical links between REC_A 201a that supports mode A (such as WCDMA) and REC_B 201b that supports mode B (such as GSM). The communication between REC_A 201a and RE 203a is implemented through the physical link CPRI-A0 between REC_A 201a and REC_B 201b and the physical link CPRI-0 between REC_B 201b and RE 203a. Specifically, REC_B 201b multiplexes the data sent by REC_A 201a to RE 203a through CPRI-A0 and the data sent by REC_B 201b to RE 203a on CPRI-0 and sends the multiplexed data to RE 203a. Likewise, the communication between REC_A 201a and RE 203b is implemented through CPRI-A1 between REC_A 201a and REC_B 201b and CPRI-1 between REC_B 201b and RE 203b and specifically, REC_B 201b multiplexes the data sent by REC_A 201a to RE 203b through CPRI-A1 and the data sent by REC_B 201b to RE 203b on CPRI-1 and sends the multiplexed data to RE 203b; and the communication between REC_A 201a and RE 203c is implemented through CPRI-A2 between REC_A 201a and REC_B 201b and CPRI-2 between REC_B 201b and RE 203c and specifically, REC_B 201b multiplexes the data sent by REC_A 201a to RE 203c through CPRI-A2 and the data sent by REC_B 201b to RE 203c on CPRI-2 and sends the multiplexed data to RE 203c. Each REC-REC or REC-RE CPRI physical link is connected through a cable such as an optical fiber or an electrical cable (such as an Ethernet cable).

The above dual-mode or multi-mode base station solution multiple CPRI physical links between single-mode RECs are established. In addition, a CPRI physical link is established between each RE and a single-mode REC directly which is connected to dual-mode or multi-mode REs. With such CPRI physical link cascading, one CPRI physical link is established between each single-mode REC and each dual-mode or multi-mode RE.

Such solution provides the following benefit: a multi-mode base station solution can be implemented through cascading of singled-mode RECs.

Figure 3:
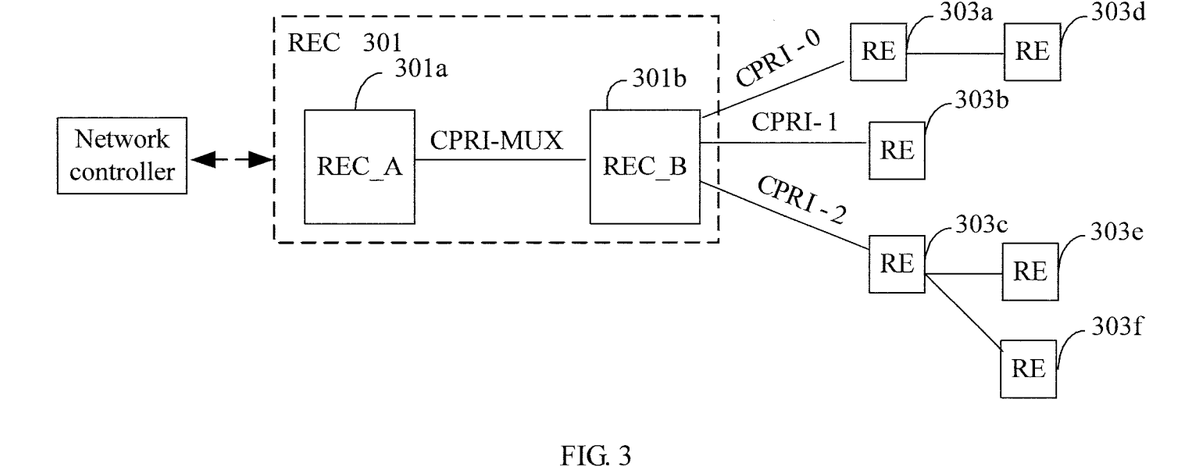
FIG. 3 is another schematic diagram of a multi-mode base station solution according to an embodiment of the invention.

Further, to reduce the complexity and cost of the system and prevent waste of system resources, another multi-mode base station solution is provided according to an embodiment of the invention as shown in FIG. 3.

An REC 301 includes REC_A 301a that supports mode A (such as WCDMA) and REC_B 301b that supports mode B (such as GSM). The REC 301 is connected to a network controller. The REC 301 may be connected to the network controller in the following way: through REC_A 301a; or through REC_B 301b, or connected to two network controllers of different communication modes respectively through REC_A 301a and REC_B 301b. REC_A 301a and REC_B 301b are connected through a multiplexed physical link CPRI-MUX which carries CPRI logical links from REC_A 301a to multiple dual-mode REs. The topology between REC_B 301b and the REs may be a star topology (such as the topology formed by REC_B 301b and RE 303a, RE 303b, and RE 303c), chain topology (such as the topology formed by REC_B 301b and RE 303a and RE 303d), or tree topology (such as the topology formed by REC_B 301b and RE 303c, RE 303e, and RE 303f). Each REC-REC or REC-RE CPRI physical link is connected through a cable such as an optical fiber or electrical cable.

The embodiment of the present invention provides a CPRI link multiplexing solution, that is, CPRI-MUX. Multiple CPRI links is carried on limited physical links, generally one high-speed physical link, therefore physical bandwidth is utilized efficiently, the number of interconnected interfaces is and the system cost are reduced, and the compatibility with the CPRI standard is kept. When the bandwidth provided by the high-speed physical link is insufficient, more physical links can be adopted.

Figure 4:
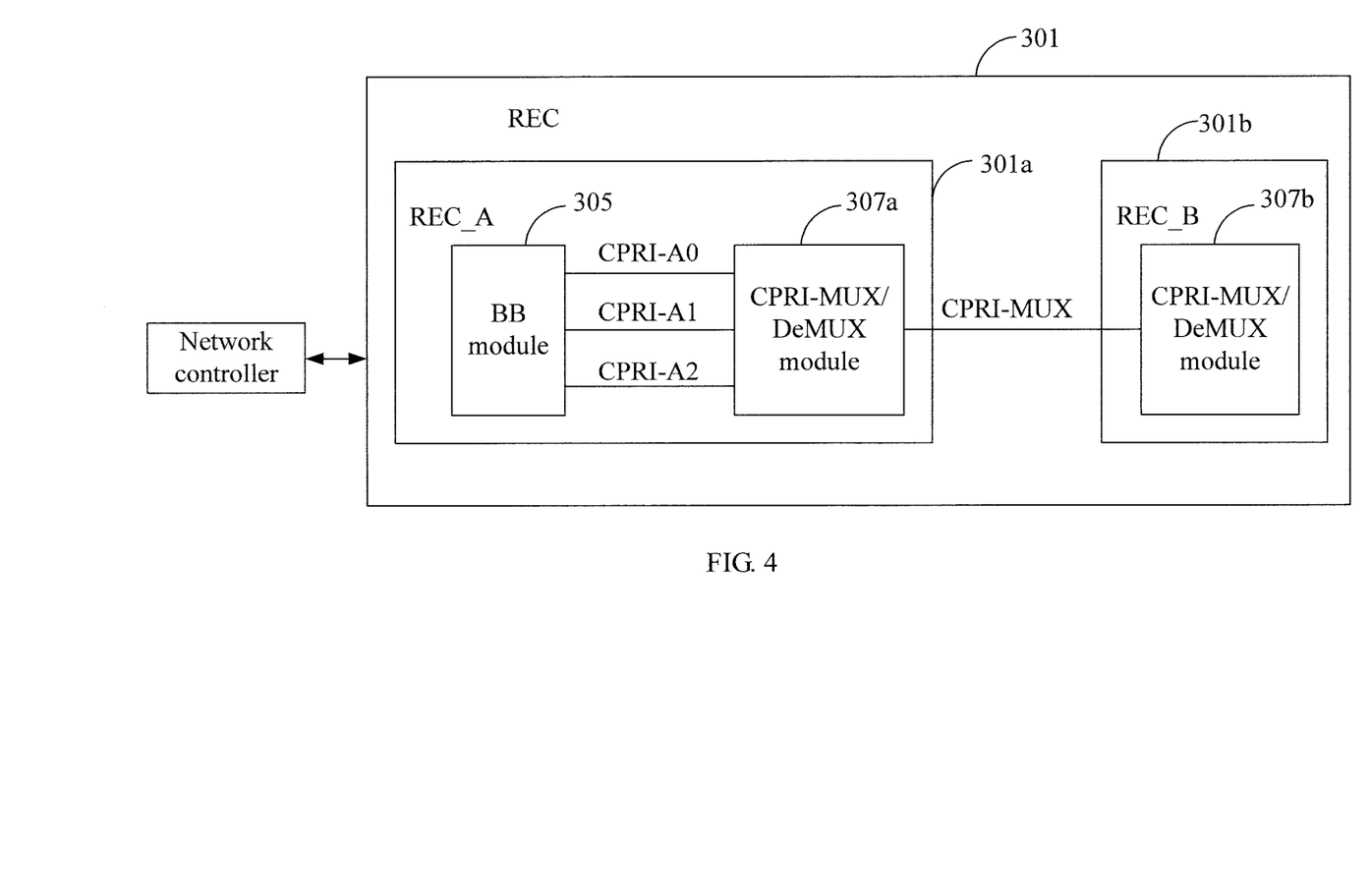
FIG. 4 is a schematic diagram of a CPRI link multiplexing solution provided in FIG. 3.

FIG. 4 is a schematic diagram of the CPRI link multiplexing solution provided in FIG. 3.

A BB module 305 and a CPRI multiplexing/demultiplexing module (CPRI-MUX/DeMUX) 307a are connected through multiple CPRI links, such as CPR1-A0, CPR1-A1, and CPR1-A2. The number of REs connected to REC_A 301a equals the number of CPRI links between the BB module 305 and the CPRI-MUX/DeMUX module 307a. The multiple CPRI links are multiplexed by the CPRI-MUX/DeMUX module 307a, and then one CPRI multiplexed (CPRI-MUX) physical link is output. The CPRI-MUX physical link connects REC_A 301a and a CPRI-MUX/DeMUX module 307b of REC_B 301b. The CPRI-MUX/DeMUX module 307b of REC_B 301b demultiplexes the inputted one CPRI-MUX physical link to obtain again the multiple CPRI links CPR1-A0, CPRI-A1, and CPR1-A2. Similarly to the embodiment shown in FIG. 2, REC_B 301b further multiplexes the data sent by REC_A 301a and REC_B 301b to the same RE on the CPRI physical link connecting REC_B 301b and the RE and sends the multiplexed data to the RE. For example, the data sent by REC_A 301a to RE 303a through CPR1-A0 and the data sent by REC_B 301b to RE 303a are multiplexed on CPRI-0 and sent the multiplexed data to RE 303a. Furthermore, REC_B 301b may further multiplex the data sent by REC_A 301a to RE 303b through CPR1-A1 and the data sent by REC_B 301b to RE 303b on CPRI-1 and send the multiplexed data to RE 303b; and multiplex the data sent by REC_A 301a to RE 303c through CPR1-A2 and the data sent by REC_B 301b to RE 303c on CPRI-2 and send the multiplexed data to RE 303c.

More embodiments of the invention are described to further explain the method for multiplexing multiple CPRI links on CPRI-MUX. In the following embodiments of the invention, the multiplexing of three CPRI links is described. The multiplexing of two or more than three CPRI links can be derived by analogy and is not further described herein.

In each embodiment of the invention, service data generally refers to practical user data or messages. Generally, if baseband processing is completed on an REC side, service data is in-phase and quadrature (IQ) data. Operation and maintenance (OM) data is the data related to operation and maintenance, and generally includes high-level data link control (HDLC) data or Ethernet data.

Figure 5:
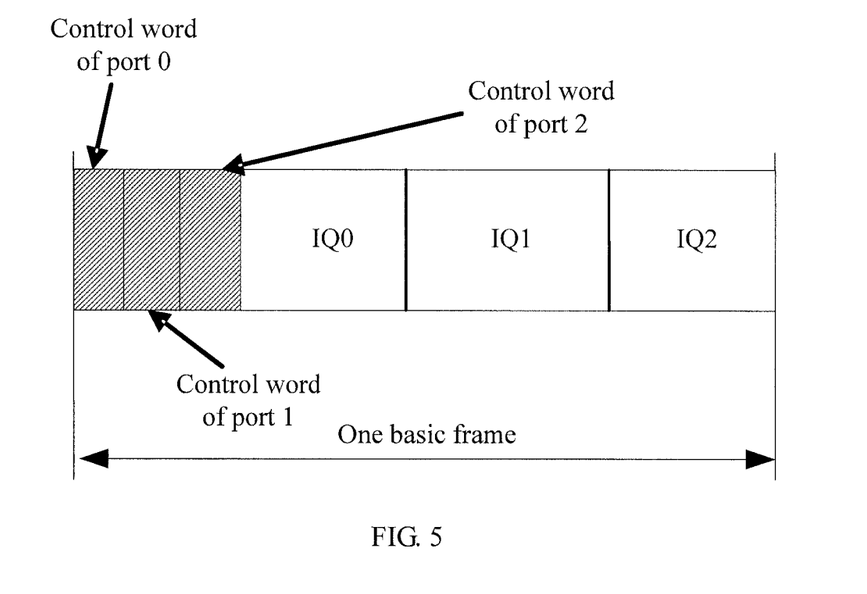
FIG. 5 is a schematic structural diagram of a CPRI basic frame of the CPRI link multiplexing method according to an embodiment of the invention.

FIG. 5 is a schematic structural diagram of a CPRI basic frame of the CPRI link multiplexing method according to an embodiment of the invention.

FIG. 5 illustrates the multiplexing of three CPRI links for exemplary purposes, where information of multiple CPRI links is multiplexed within one CPRI basic frame that is transmitted on the CPRI-MUX link and used as a unit. Assume three CPRI ports are used to connect three REs to support the three CPRI links. This means that one CPRI port corresponds to one CPRI link and that one CPRI link corresponds to one RE. The control words and service information (such as an IQ data block) of the three ports separately use resources in the basic frame.

K28.5 synchronization byte in the basic frame: according to the CPRI protocol, a control word of the 0th basic frame in every 256 basic frames of CPRI is a K28.5 synchronization byte. When the CPRI-MUX carries multiple CPRI links, if the control word of each CPRI link carries a K28.5 byte, a synchronization error occurs. Therefore, only the control word of port 0 on CPRI-MUX carries the K28.5 byte.

Multiplexing information of the basic frame: the control word of port 0 identifies a CPRI version and carries detailed information of CPRI link multiplexing, for example, information is carried in a MUX-HEAD field. The receiver of the basic frame can perform resolution according to the CPRI version information to know whether the basic frame is in CPRI link multiplexing mode. If the received basic frame is in CPRI link multiplexing mode, the receiver further resolves MUX-HEAD information. If the received basic frame is not in CPRI link multiplexing mode, the receiver processes the received basic frame in a non-multiplexing mode.

MUX-HEAD in the basic frame: a multiplexed basic frame includes information of multiple ports. In a downlink direction, the multiplexed basic frame information must be exchanged to different ports; in an uplink direction, the CPRI data of the multiple ports must be multiplexed on one CPRI-MUX physical link. Because the MUX-HEAD field carries detailed information of CPRI link multiplexing, the content of the MUX-HEAD field needs to be defined in detail, including the number of CPRI ports, the length and a start position of the control word of each port, the length and a start position of service information (such as an IQ data block) of each port, and the length of the MUX-HEAD field. The receiver of the multiplexed basic frame can thereby exchange and route the information of each CPRI link according to the information carried by the MUX-HEAD field. The MUX-HEAD field may be an idle field of the CPRI control word, for example, a vendor-defined field specified in the CPRI protocol.

CPRI control words of CPRI links are arranged in a centralized manner and IQ information of each CPRI link is also arranged in a centralized way. CPRI control words and IQ information of different CPRI links are distributed in a basic frame relatively independently of each other. The start position of the control words and the start position of IQ information are designated in the MUX-HEAD field separately, helping the REC directly connected to an RE to forward the information to the RE.

From the above description, it is obvious that, when the CPRI-MUX carries only one CPRI link, the multiplexed basic frame is a standard CPRI basic frame which includes the control word and IQ information of only one CPRI link.

Figure 6:
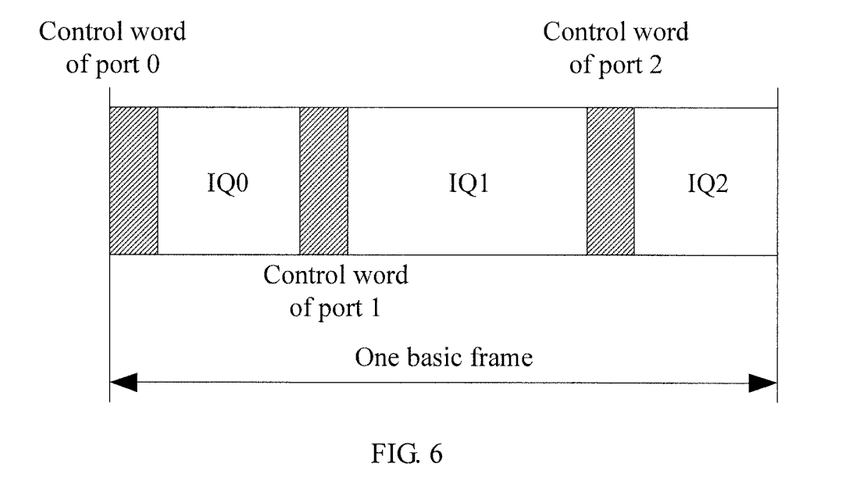
FIG. 6 is a schematic structural diagram of a CPRI basic frame of the CPRI link multiplexing method according to another embodiment of the invention.

FIG. 6 is a schematic structural diagram of a CPRI basic frame of the CPRI link multiplexing method according to an embodiment of the invention.

This embodiment is basically the same as the embodiment shown in FIG. 5 and the difference is that: in this embodiment of the invention, the control words of CPRI links are not arranged in a centralized way but distributed dispersedly in the basic frame, for example, placed together with the IQ information of the related CPRI link. As shown in FIG. 6, the control word of port 0 is placed together with IQ0; the control word of port 1 is placed together with IQ1; and the control word of port 2 is placed together with IQ2.

Figure 7:
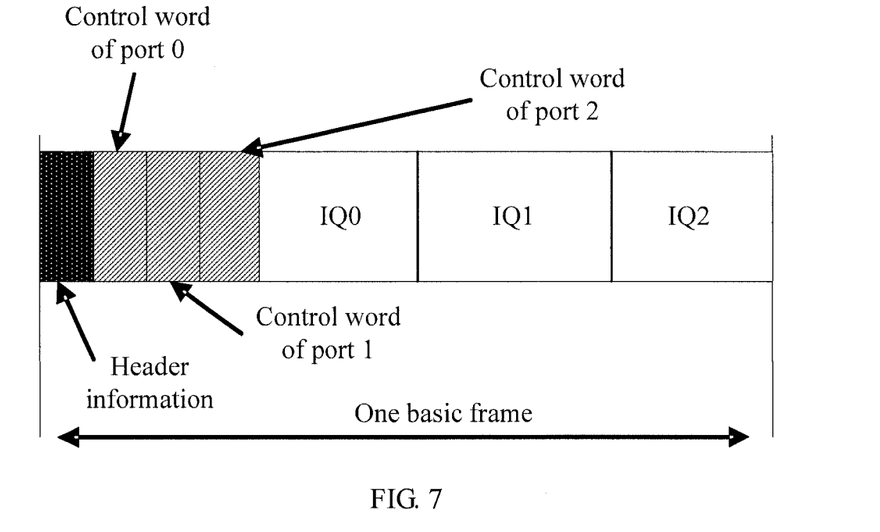
FIG. 7 is a schematic structural diagram of a CPRI basic frame of the CPRI link multiplexing method according to another embodiment of the invention.

FIG. 7 is a schematic structural diagram of a CPRI basic frame of the CPRI link multiplexing method according to an embodiment of the invention.

In the embodiment of the invention, the multiplexed CPRI basic frame provides a header information field in a start position, the header information field carries the following information: whether the basic frame is a multiplexed CPRI basic frame, the number of CPRI ports, a start position of the control word of each port, the length and a start position of the IQ information of the each port, and the length of the header information field.

Behind the header information field, the control words and IQ information of each CPRI links are arranged. The control words of each CPRI links can be arranged according to the arrangement shown in FIG. 5 or FIG. 6. The embodiment shown in FIG. 7 adopts the arrangement in FIG. 5.

The K28.5 byte in the basic frame is provided in the header information field.

Figure 8:
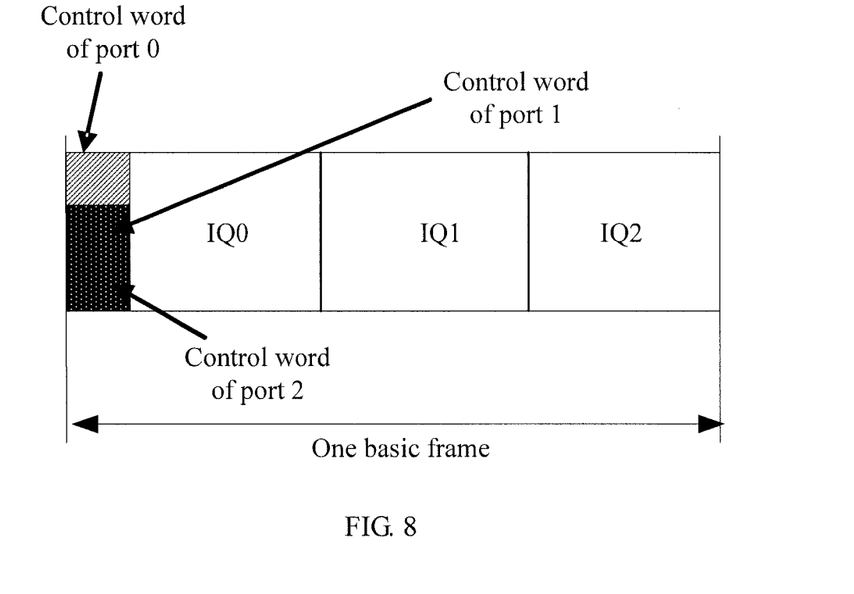
FIG. 8 is a schematic structural diagram of a CPRI basic frame of the CPRI link multiplexing method according to still another embodiment of the invention.

FIG. 8 is a schematic structural diagram of a CPRI basic frame of the CPRI link multiplexing method according to an embodiment of the invention.

This embodiment is basically the same as the embodiment shown in FIG. 5 and the greatest difference is that: the control word of multiple CPRI links are compressed. If the control words of multiple CPRI links are distributed separately in the basic frame, the control word fields of the CPRI links are possibly idle. To reduce the waste of bandwidth, the control word of multiple CPRI links may be compressed as shown in FIG. 8. The length of the control word field that includes the compressed control word of multiple CPRI links can be flexibly defined in bytes, such as 2 bytes and 4 bytes. The length of the control word of the CPRI links is included in the MUX-HEAD field.

Figure 9:
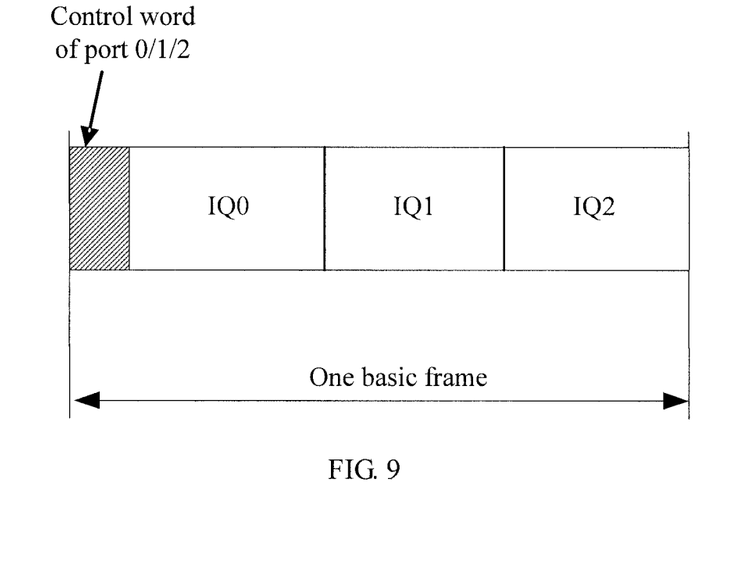
FIG. 9 is a schematic structural diagram of a CPRI basic frame of the CPRI link multiplexing method according to still another embodiment of the invention.

FIG. 9 is a schematic structural diagram of a CPRI basic frame of the CPRI link multiplexing method according to an embodiment of the invention.

This embodiment is basically the same as the embodiment shown in FIG. 5 and the greatest difference is that: multiple CPRI links share one control word field. OM information such as HDLC information and Ethernet information is multiplexed to the shared control and clock information field in time division multiplexing mode. Other information may share domains of the control and clock information field and may also use an internally reserved or vendor-reserved idle domain in the shared control and clock information field.

In the previous embodiments of the invention, the MUX-HEAD uses an independent physical channel to transmit the following CPRI link multiplexing information: whether the basic frame is a multiplexed CPRI basic frame, the number of CPRI ports, the length and a start position of the control word of each port, the length and a start position of the service information (such as an IQ data block) of each port, and the length of the MUX-HEAD field. In this embodiment of the invention, maybe it is unnecessary to use a dedicated physical channel to transmit the above CPRI link multiplexing information, but instead, two single-mode RECs transmit the CPRI link multiplexing information through message interaction on an OM channel on the CPRI such as HDLC and Ethernet. After the REC directly connected to the RE receives the related information, the REC forwards and routes the information between the upper-level REC and the RE according to the received CPRI link multiplexing information.

Therefore, taking CPRI as an example, in the embodiments of the present invention, by carrying multiple CPRI links on limited physical links (CPRI-MUX), generally one high-speed physical link, physical bandwidth can be used more efficiently and the number of interconnected interfaces and the system cost are reduced without compromising with the CPRI standard. When the bandwidth provided by the high-speed physical link is insufficient, more physical links can be adopted.

On the CPRI-MUX link, the control word and IQ information of CPRI links are independent of each other. The control word and the length of IQ information of each CPRI link can be defined and configured according to the requirement of the vendor or operator. CPRI link multiplexing information includes: whether the basic frame is a multiplexed CPRI basic frame, the number of REC-RE ports, the length and a start position of the control word of each port, and the length and a start position of the service information (such as an IQ data block) of each port. The CPRI link multiplexing information can be transmitted through an independent physical channel or share the physical channel of OM information.

Although the communication signal multiplexing method, radio communication system, and radio equipment controller of the present invention have been described in detail through exemplary embodiments, the invention is not limited to such embodiments. It is apparent that those skilled in the art can make various modifications and variations to the invention without departing from the spirit and scope of the present invention. The invention is intended to cover the modifications and variations provided that they fall within the scope of protection defined by the claims or their equivalents.

What is claimed is:

1. A communication signal multiplexing method, applicable to a radio communication system, comprising:
   receiving, by a second radio equipment controller (REC), first multiplexed data, the data sent by a first radio equipment controller (REC) to a first multi-mode radio equipment (RE) and to a second multi-mode RE;
   demultiplexing the first multiplexed data to obtain data sent by the first REC to the first multi-mode RE and to obtain data sent by the first REC to the second multi-mode RE;
   multiplexing the data sent by the first REC to the first multi-mode RE and data sent by the second REC to the first multi-mode RE, to obtain second data;
   multiplexing the data sent by the first REC to the second multi-mode RE and data sent by the second REC to the second multi-mode RE, to obtain third data;
   sending the second data to the first multi-mode RE; and
   sending the third data to the second multi-mode RE;
   wherein: the first multiplexed data is obtained by multiplexing the data sent by the first REC to the first multi-mode RE and the data sent by the first REC to the second multi-mode RE on at least one physical link and by including link multiplexing information indicative of a frame of the first multiplexed data being a multiplexed frame, number of ports connecting RECs and REs, and a length and a start position of control information of the ports or a length and a start position of service information of the ports and the second REC receives the first multiplex data from the first REC through the at least one physical link.

2. The method of claim 1, wherein the link multiplexing information is transmitted through an independent physical resource or shares a transmitting physical resource with operation and maintenance information.

3. The method of claim 1, wherein the at least one physical link is a common public radio interface (CPRI) physical link or an open base station architecture initiative (OBSAI) physical link.

4. A radio equipment controller (REC), connected to at least a first multi-mode radio equipment (RE) and a second multi-mode RE, and the REC comprising a multiplexing/demultiplexing module which is configured to:
   receive first multiplexed data, the data sent by another REC to the first multi-mode RE and to the second multi-mode RE;
   demultiplex the first multiplexed data to obtain data sent by the another REC to the first multi-mode RE and to obtain data sent by the another REC to the second multi-mode RE;
   multiplex the data sent by the another REC to the first multi-mode RE and data sent by the REC to the first multi-mode RE, to obtain second data; and
   multiplex the data sent by the another REC to the second multi-mode RE and data sent by the REC to the second multi-mode RE, to obtain third data; wherein:
   the first multiplexed data is obtained by multiplexing the data sent by the another REC to the first multi-mode RE and the data sent by the another REC to the second multi-mode RE on at least one physical link and by including link multiplexing information indicative of a frame of the multiplexed data being a multiplexed frame, number of ports connecting RECs and REs, and a length and a start position of control information of the ports or a length and a start position of service information of the ports and the multiplexing/demultiplexing module receives the first multiplexed data from the another REC through the at least one physical link.

5. The REC of claim 4, wherein the link multiplexing information is transmitted through an independent physical resource or shares a transmitting physical resource with operation and maintenance information.

6. The REC of claim 4, wherein the at least one physical link is a common public radio interface (CPRI) physical link or an open base station architecture initiative (OBSAI) physical link.

7. A radio equipment controller (REC), communicating with at least a first multi-mode Radio Equipment (RE) and a second multi-mode RE and comprising a multiplexing/demultiplexing module which is configured to:
    multiplex, on at least one physical link, data sent to the first multi-mode RE and the second multi-mode RE, include in the multiplex data link multiplexing information indicative of a frame of the multiplexed data being a multiplexed frame, number of ports connecting RECs and REs, and a length and a start position of control information of the ports or a length and a start position of service information of the ports, and send the multiplexed data to another REC; and
    demultiplex the data received from the first multi-mode RE and the second multi-mode RE through the at least one physical link.

8. A radio communication system, comprising a first radio equipment controller (REC) and a second REC, wherein the second REC is connected to at least a first multi-mode RE and a second multi-mode RE, and the second REC comprising a multiplexing/demultiplexing module which is configured to:
    receive first multiplexed data, the data sent by the first REC to the first multi-mode RE and to the second multi-mode RE;
    demultiplex the first multiplexed data to obtain data sent by the first REC to the first multi-mode RE and to obtain data sent by the first REC to the second multi-mode RE;
    multiplex the data sent by the first REC to the first multi-mode RE and data sent by the second REC to the first multi-mode RE, to obtain second data; and
    multiplex the data sent by the first REC to the second multi-mode RE and data sent by the second REC to the second multi-mode RE, to obtain third data; wherein:
    the first multiplexed data is obtained by multiplexing the data sent by the first REC to the first multi-mode RE and the data sent by the first REC to the second multi-mode RE on at least one physical link and by including link multiplexing information indicative of a frame of the multiplexed data being a multiplexed frame, number of ports connecting RECs and REs, and a length and a start position of control information of the ports or a length and a start position of service information of the ports, and the multiplexing/demultiplexing module receives the first multiplexed data from the first REC through the at least one physical link.

9. The radio communication system of claim 8, wherein the link multiplexing information is transmitted through an independent physical resource or shares a transmitting physical resource with operation and maintenance information.

10. The radio communication system of claim 8, wherein the at least one physical link is a common public radio interface (CPRI) physical link or an open base station architecture initiative (OBSAI) physical link.

11. The radio communication system of claim 8, wherein the first REC is configured to multiplex data sent to the first multi-mode RE and the second multi-mode RE on at least one physical link and send the multiplexed data to the second REC; and
    demultiplex the data received from the first multi-mode RE and the second multi-mode RE through the at least one physical link.

* * * * *